May 16, 1939.  F. W. SEECK  2,158,157

DIFFERENTIAL MECHANISM

Filed May 3, 1938  3 Sheets-Sheet 1

Inventor:
Ferdinand W. Seeck
by T. J. Geisler and
V. R. R. Geisler
Attorneys.

May 16, 1939.　　　　F. W. SEECK　　　　2,158,157
DIFFERENTIAL MECHANISM
Filed May 3, 1938　　　3 Sheets-Sheet 2

Inventor:
Ferdinand W. Seeck
by T. J. Geisler
and F. R. Geisler
Attorneys.

May 16, 1939.   F. W. SEECK   2,158,157
DIFFERENTIAL MECHANISM
Filed May 3, 1938   3 Sheets-Sheet 3
Fig. 6.
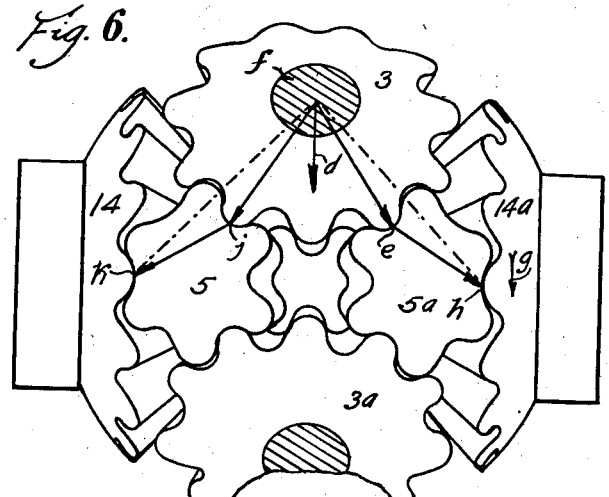
Fig. 8.
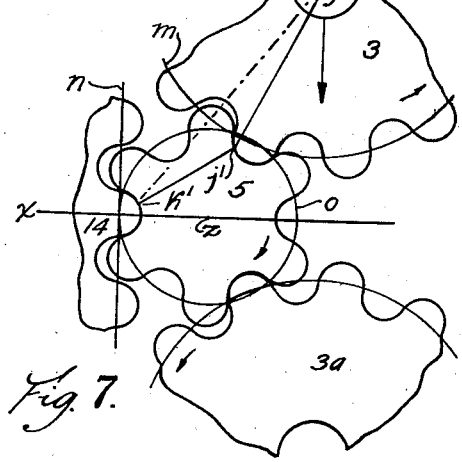
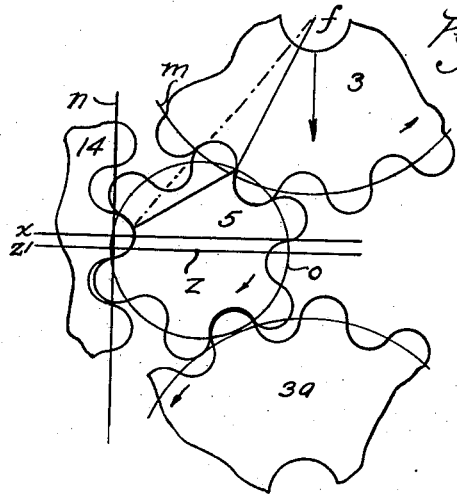
Fig. 7.
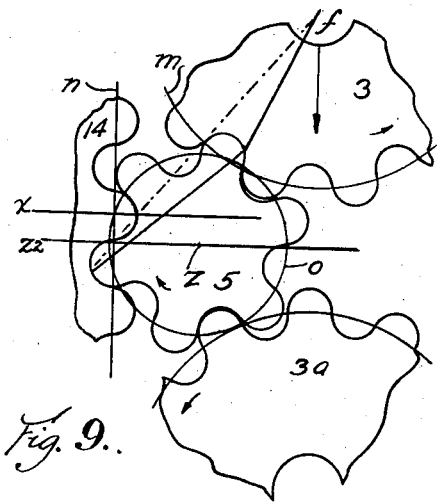
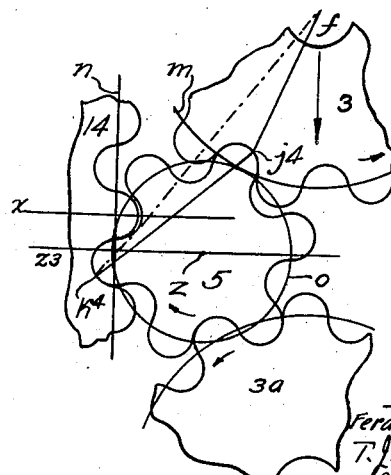
Fig. 9.
Fig. 10.
Inventor:
Ferdinand W. Seeck
by
Attorneys Patented May 16, 1939

2,158,157

UNITED STATES PATENT OFFICE 2,158,157

DIFFERENTIAL MECHANISM

Ferdinand W. Seeck, Lebanon, Oreg.

Application May 3, 1938, Serial No. 205,728

13 Claims. (Cl. 74—311)

This invention relates to differentials of the type suitable for use in motor driven vehicles, thru which driving force is transmitted to each of the propelling wheels, but in which provision is made whereby one wheel may be rotated faster than the other under certain conditions. These conditions occur, for example, when the vehicle is turning in a curve.

With vehicle differentials in most general use there is always equal division of power between the two driving wheels. Thus, when the traction of the two wheels is unequal, for example, when one wheel is passing over ice, no greater driving force can be exerted by the wheel having the greater traction than is exerted by the other wheel. The principal object of this invention is to provide a practical differential mechanism which, while meeting the usual requirements for vehicle differentials, will also operate to apply more rotative power to the wheel having the greater traction or road grip whenever the traction of the two wheels is unequal.

A further object of this invention is to provide such an improved differential which will also be as simple, strong and compact as the vehicle differentials now in popular use.

These and incidental objects I attain by the employment of additional bevel gears in a differential mechanism. The construction, placing and function of these additional bevel gears and the effects produced thru them will be described with reference to the accompanying drawings.

In the drawings:

Fig. 6 is a view similar to Fig. 1 but with all shading omitted;

Figs. 7, 8, 9 and 10 are fragmentary diagrammatic illustrations of the mode of operation of and resulting forces transmitted thru the medium of one of the oscillating bevel gears of my device.

Figure 1:
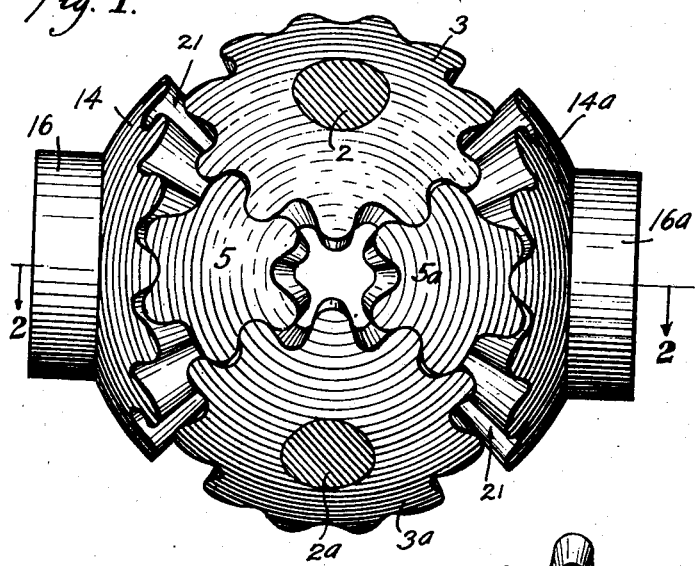
Fig. 1 is an elevation of the main portion of the mechanism of my differential with the outer casing and connections removed.
Figure 2:
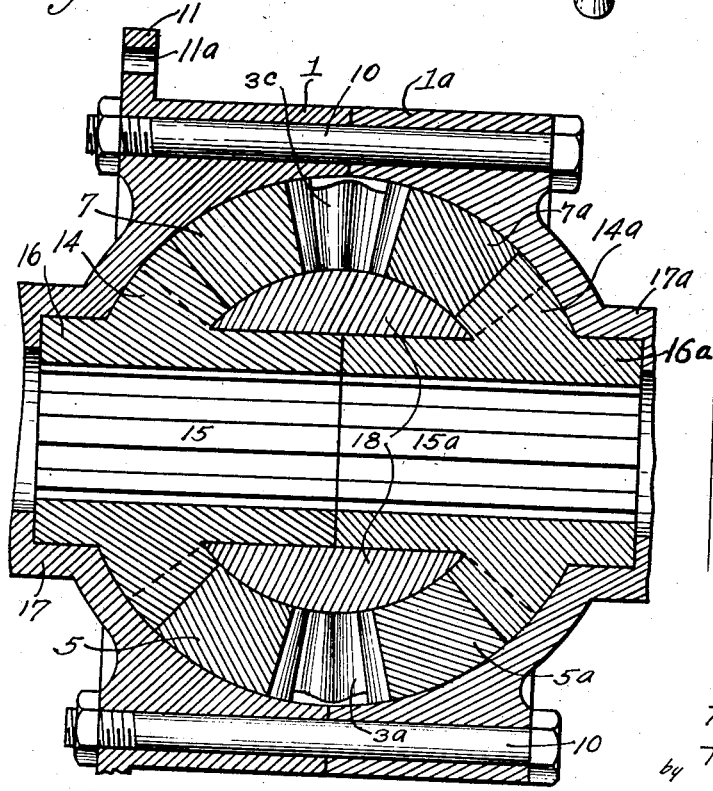
Fig. 2 is a horizontal medial section thru the differential mechanism and casing corresponding to the line 2—2 of Fig. 1.
Figure 3:
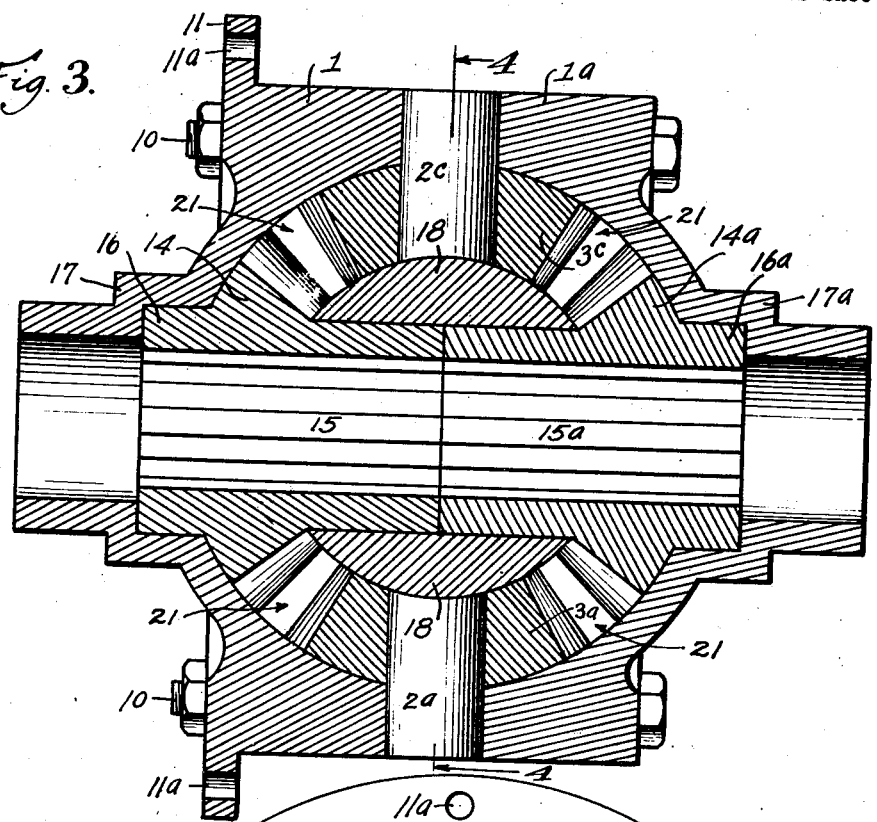
Fig. 3 is a horizontal medial section similar to Fig. 2 but taken with the mechanism and casing rotated 45° from the positions illustrated by Figs. 1 and 2.
Figure 4:
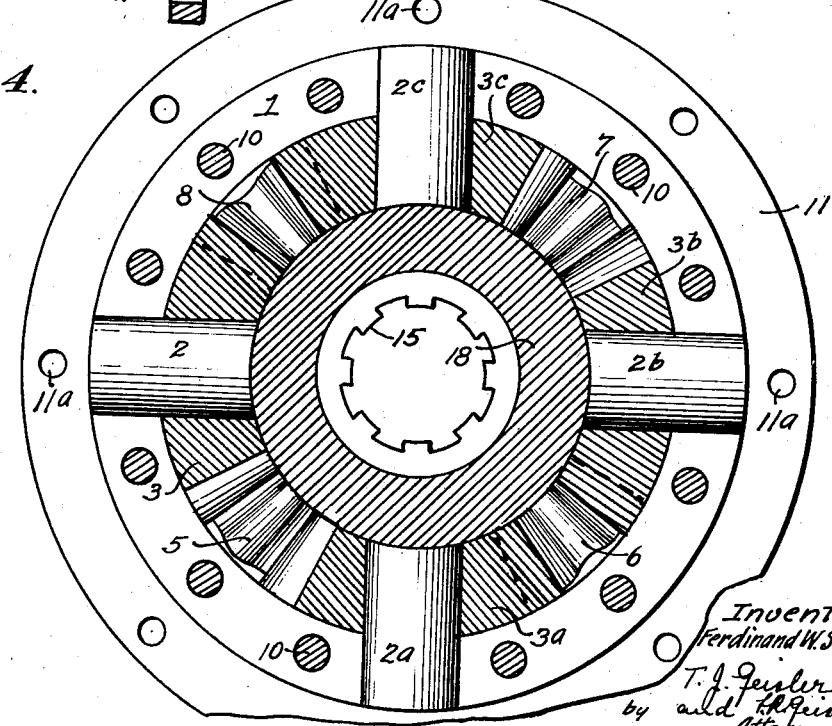
Fig. 4 is a transverse vertical medial section thru the differential and casing corresponding to the line 4—4 of Fig. 3.

Referring first to Figs. 2, 3 and 4, the differential casing comprises two sections 1 and 1a held together by bolts 10. Section 1 of the casing has a flange 11, provided with holes 11a, by which a ring gear (not shown) is connected to the casing thru the medium of which rotated power is transmitted in the manner customary with vehicle differentials. Radial stub shafts 2, 2a, 2b and 2c, supported by the casing and extending from the interior surface of the casing, constitute a spider rotating with the casing, the stub shafts being all in the same vertical plane. The construction thus far is well known in vehicle differentials. Bevel pinions 3, 3a, 3b and 3c are carried on the stub shafts 2, 2a, 2b and 2c, respectively. Two of these bevel pinions, 3 and 3a, are shown more clearly in Fig. 1.

Axle bevel gears, 14 and 14a, are located in horizontal axial alinement, as shown in Figs. 1, 2 and 3. The interiors of these axle bevel gear members are bored and splined as shown at 15 and 15a, for the purpose of securing the vehicle axles (not shown) therein. The outer ends of these axle bevel gear members are formed with annular flanges 16 and 16a, respectively, which are rotatably supported within the annular extensions 17 and 17a of the casing sections 1 and 1a. The inner ends of the axle bevel gear members are rotatably supported in the central spherical member 18 (see Figs. 2, 3 and 4), which is bored to accommodate them.

Figure 5:
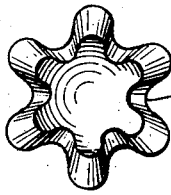
Fig. 5 is an inside view of one of the oscillating bevel gears comprising essential elements of my device, two of which oscillating bevel gears are shown in Fig. 1.

Unlike other differential mechanisms of this type, the bevel pinions 3, 3a, etc. (see Fig. 1) do not mesh with the axle bevel gears 14 and 14a, but are spaced from said axle bevel gears and from each other, as shown at 21 in Figs. 1 and 3. Instead, said bevel pinions and said axle bevel gears mesh with intermediate oscillating bevel gears 5, 5a, 6, 6a, 7, 7a, 8, etc., some of which are shown in Figs. 1, 2 and 4, these oscillating bevel gears being preferably identical in shape and size, one of these being illustrated by Fig. 5. These oscillating bevel gears constitute the most important element of my invention. The centers of these oscillating bevel gears are not fixed, but these gears are slidable within a limited space on the concave surface of the inside of the case 1 and 1a. Actually, these oscillating gears not only rotate under certain conditions, but their centers move within small fields, and consequently I have designated them as oscillating gears to distinguish them from ordinary pinion gears.

Figure 11:
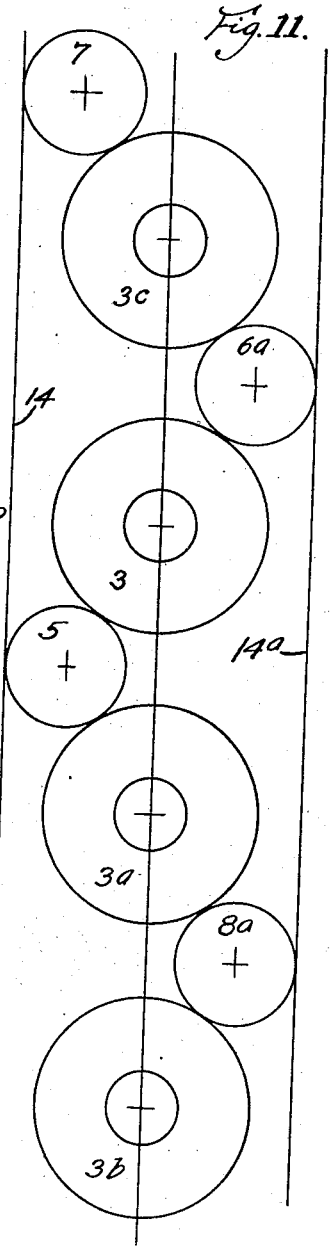
Fig. 11 is a schematic drawing illustrating a modified arrangement for the oscillating bevel gears.

While I have shown these oscillating bevel gears arranged in pairs between the pinion gears 3, 3a, etc., this is a preferred arrangement only, and the oscillating gears might be arranged singly and alternately, that is to say, with one oscillating gear between each two pinion gears, one oscillating gear meshing with one axle bevel gear, and the next oscillating gear between the next two pinion gears meshing with the opposite axle bevel gear. This is illustrated schematically by Fig. 11. Also, while I show four bevel pinions, namely, 3, 3a, 3b and 3c, this number might be varied. However, there should be at least one oscillating gear between each two pinion gears, such oscillating gear meshing with the pinion gears and with one of the axle bevel gears. The axle bevel gears, pinion gears, and oscillating gears are formed with meshing gear teeth. These teeth preferably have rounded points $p$ and rounded cavities $w$ as shown more clearly in Fig. 5. These rounded points and cavities when so formed provide a rolling thrust bearing which will be brought out more fully later with reference to Figs. 6, 7, 8, 9 and 10.

The operation of my differential mechanism will be explained first with reference to Fig. 6. Let it be assumed that the casing, and therewith the spider and pinion gears 3, 3a, etc., are being driven in the direction indicated by the arrow $d$ in Fig. 6, that is to say are being rotated in a counter-clockwise direction when viewed from the right of Fig. 6. Two cases will first be described.

Case 1: (When resistance to rotation offered by both axle bevel gears is equal).—The direction of the force exerted across pinion gear 3 to the oscillating gears 5 and 5a may be indicated by the lines $f$—$j$ and $f$—$e$, respectively. This force at the point $j$ would normally have two tendencies, a thrust in the direction $j$—$k$, tending to turn axle gear 14, and a tendency to rotate gear 5 in a clockwise direction. Similarly, the force at point $e$ would have a thrust in the direction $e$—$h$ and at the same time a tendency to rotate gear 5a in a counter-clockwise direction. But if gear 5 were to rotate in clockwise direction, it would force pinion gear 3 to rotate counter-clockwise; and if gear 5a were to rotate in counter-clockwise direction, it would force pinion gear 3 to rotate clockwise. However, since these opposed rotative forces are equal, no rotation takes place. Both gear 5 and gear 5a are prevented by pinion gear 3 from rotating. The thrusts in the direction $j$—$k$ and $e$—$h$ are equal, and, since both resistances are equal, the entire differential rotates as a unit and the vehicle axles turn in unison.

Case 2.—Let it be assumed that the axle bevel gear 14a offers negligible resistance, while the resistance offered by the other axle bevel gear 14 is sufficient to cause the latter to remain stationary. This might occur, for instance, when the vehicle turns around in a sharp circle and one wheel remains stationary while the other rotates. When the point $k$ holds, the force exerted at $f$ in the direction $f$—$j$ will compel gear 5 to rotate clockwise. Gear 5 in turn will force pinion gear 3 to rotate counter-clockwise, and the latter will rotate gear 5a clockwise. The result is that axle gear 14a is rotated in the direction indicated by the arrow $g$ by the turning of gear 5a. But axle gear 14a is also rotated in the same direction by the turning of the spider and casing of the differential. The result is that axle gear 14a rotates at twice the speed, since this speed is equal to the combined speeds of the spider and of the gear 5a. Thus when the vehicle turns in a sharp circle with one wheel remaining stationary, the other wheel turns at twice the speed.

In these two cases just described my differential acts in the same way and produces the same differential result as the differentials in present general use, when the vehicle is moving in a straight pathway with the traction on both wheels equal, as with Case 1, or when the vehicle is turning a sharp curve with one of the wheels stationary, as mentioned in Case 2. There is a third case which occurs when the traction is unequal, or when one of the vehicle wheels is turning faster than the other. The most important action of my differential takes place under such conditions, that is, when some resistance is offered by both axle gears but when this resistance is unequal. Two results occur in this case which will be explained separately as result A and result B.

Case 3 (result A).—Let it be assumed that both axle bevel gears 14 and 14a are turning but that 14 offers the greater resistance. Referring to Fig. 6, power applied at point $f$ is transmitted in the direction $f$—$j$ and across the oscillating gear 5 in the direction $j$—$k$ as already explained. Since the angle $f$—$j$—$k$ is almost a straight angle, the greater portion of this power results in a turning thrust exerted at point $k$ on the axle bevel gear 14, and while this power also has a tendency to cause oscillating gear 5 to be rotated clockwise, and indirectly gear 3 to be rotated counter-clockwise, any resistance to such rotation will increase the resulting thrust along the path $f$—$j$—$k$. When the point $f$ moves (in the direction indicated by the arrow $d$) axle bevel gear 14 must either move at the same speed or oscillating gear 5 will rotate in a clockwise direction. Any rotation of gear 5 clockwise will force pinion gear 3 to rotate counter-clockwise and force rotation of gear 5a clockwise. Consequently, any resistance to the rotation of gear 5a clockwise (since this results in resistance to the rotation of gear 5 clockwise) increases the thrust exerted along the path $f$—$j$—$k$, in other words, increases the thrust exerted against the axle bevel gear offering the greater resistance. Also the more nearly the path $f$—$j$—$k$ approaches a straight line the greater will be the amount of turning force exerted on axle bevel gear 14.

Case 3 (result B).—This result, which is caused by the operation of the oscillating gears under these conditions, will be explained more fully with reference to the diagrammatic Figs. 7, 8, 9 and 10, the oscillating gear 5 being selected for purposes of illustration. In these Figs. $m$, $n$ and $o$ diagrammatically denote the pitch circles of the teeth of pinion gear 3, axle gear 14, and oscillating gear 5, respectively. Since the center $z$ of gear 5 is not fixed, but, when gear 5 is rotated, will shift within certain limits, the pitch circle $o$ of gear 5 will sometimes cross the pitch circles $m$ and $n$, and subsequently move out again. Thus the distance between point $f$ and center point $z$ will vary. Referring to Fig. 7, let it be assumed first that axle gear 14 is being temporarily held against rotation, and that a tooth on gear 14 is being temporarily held against rotation, and that a tooth on gear 14 is in full mesh with gear 5. The pitch circles $n$ and $o$ will now be tangent. The center $z$ of gear 5 lies in the line $x$ extending thru the point of tangency and thru the center of the tooth of axle gear 14. The gears 3 and 5 are not in full mesh and the pitch circles m and o therefore intersect each other slightly. (Pinion gear 3a in this description may be regarded merely as an idling gear). Force at f will be transmitted in the lines f—j' and j'—k'. But the force f—j' will also act to rotate gear 5 clockwise. Assuming that axle gear 14 temporarily remains stationary, and, consequently, that gear 5 rotates slightly, the positions of gear 5 and pinion gear 3 will then change to the positions illustrated in Fig. 8.

In Fig. 8 the pitch circles m and o intersect further, while the pitch circles o and n intersect slightly, and the center z of gear 5 has moved from a point in the line x to a point in the line z'.

The further slight rotation to the same extent of gear 5 and pinion 3, clockwise and counter-clockwise, respectively, with axle gear 14 remaining stationary, will bring the rotating gears into the position diagrammatically illustrated in Fig. 9. The pitch circles o and m now intersect each other less, while circles o and n intersect to a greate extent. The center z will have moved to some point in another line such as z2.

Fig. 10 illustrates what takes place with further similar rotation of gears 5 and 3. The pitch circles o and m are now tangent while pitch circles o and n intersect only slightly, and the center z is in the line z3.

A comparison of the changed position from Fig. 7 to Fig. 10 shows first of all that the angle f, j', k' of Fig. 7 has been increased to the angle f, j4, k4 in Fig. 10. In other words, a greater amount of force will now follow the path f—j4—k4 than followed over f—j'—k' in Fig. 7, other conditions being equal. The four figures thus represent the accumulation of an increasingly greater direct thrust against axle gear 14, which is the axle gear offering the greater resistance. But this is not all that has happened.

Greater or less resistance to rotation of meshing gears, when the center of one of them is not fixed, occurs as the amount of intersection of their pitch circles varies. Thus, as the position of the gears 3 and 5 changes from Fig. 8 to Fig. 9, and then from Fig. 9 to Fig. 10, the pitch circles are moving from the maximum intersection, shown in Fig. 8, to tangency or no intersection in Fig. 10. Similarly, the pitch circles of axle gear 14 and oscillating gear 5 move from the amount of intersection shown in Fig. 9 to the lesser amount shown in Fig. 10. Briefly, the effect of the shifting of the center z of the oscillating gear 5, and the resulting changes of the relative positions of pitch circles o and m and o and n, will produce intermittent and recurring resistance to rotation of the oscillating gear. In other words, when gears 5 and 3 rotate from the positions in Fig. 8 to their positions as shown in Fig. 10, greater resistance to such rotation is offered, for the pitch circles o and m must change from their relative positions of maximum intersection (Fig. 8) to the position of tangency of Fig. 10. On the other hand less resistance is offered to such rotation when gears 5 and 3 continue rotation and change from the position in Fig. 10 again to the position in Fig. 7, and subsequently from the position in Fig. 7 to the position in Fig. 8. Thus, it will be apparent that such intermittent resistance to rotation occurs with respect to gears 3 and 5 and 5 and 14. In other words, as the pitch circles of the gears 3 and 5, and also the pitch circles of the gears 5 and 14, move into and out of intersection, the distance between the center of pinion gear 3 (which is the driving member) and center z of the oscillating gear 5, and between center z and the center of axle gear 14 which is the driven member) increase and decrease. This causes intermediate and recurring resistance to rotation of oscillating gear 5 which resistance operates to cause a greater turning thrust to be applied on gear 14. The same occurs with respect to pinion gear 3a when the direction of the driving power is reversed.

But, as has been previously pointed out, any resistance to the rotation of oscillating gear 5 (in a clockwise direction in this illustration) increases the turning thrust exerted on axle bevel gear 14, which is the object desired.

What occurs with oscillating gear 5, (and with the other oscillating gears meshing with axle bevel gear 14) occurs also with oscillating gear 5a (Fig. 6), (and similarly with the oscillating gears meshing with axle gear 14a). Both oscillating gears 5 and 5a must turn in the same direction. Both encounter recurring periods of greater resistance to rotation. But each is being affected in an opposite manner, and since the normal tendency of each is to be rotated in an opposite direction, alternating maximum resistance is set up by gears 5 and 5a with complementary stabilizing resistance to rotation, which results in a steady turning thrust of greater power on that axle bevel gear offering the greater resistance.

The amount of this resistance just described, which opposes the rotation of the oscillating gears, and opposes particularly the rotation of those oscillating gears meshing with the axle bevel gear on which the greater load is imposed, can be varied to some extent by "retiming" the entire mechanism with respect to the number and spacing of the gear teeth and the proportioning of the pitch circles. With the proper selection of these elements the most efficient results are obtained including even movement of the axle bevel gears (assuming that the rotation of the differential casing and spider is uniform and that conditions remain the same) with a steady greater turning thrust imposed on that axle bevel gear offering the greater resistance.

I claim:

1. A differential mechanism of the character described including a housing, means for rotating said housing, a pair of axle gears in axial alinement rotatably mounted within said housing, pinion gears mounted on shafts extending radially inward within said housing, said shafts carried by said housing, said pinion gears positioned between said axle gears but not meshing with them, and bevel gears between each two pinion gears, each bevel gear meshing with two pinion gears and with one of said axle gears.

2. A differential mechanism of the character described including a housing, means for rotating said housing, a pair of axle gears in axial alinement rotatably mounted within said housing, pinion gears mounted on shafts extending radially inward within said housing, said shafts carried by said housing and located in a plane perpendicular to the axis of said axle gears, said pinion gears positioned between said axle gears but not meshing with them, and oscillating bevel gears meshing with said pinion gears and with said axle gears, each of said oscillating gears meshing with two of said pinion gears and one of said axle gears.

3. In a differential mechanism of the character described, a housing, a pair of axle gears oppositely arranged in axial alinement, pinion gears mounted on shafts extending radially inward within said housing, said shafts carried by said housing, said pinion gears positioned between said axle gears but not meshing with them, and bevel gears between each two pinion gears, each bevel gear meshing with two pinion gears and with one of said axle gears.

4. In a differential mechanism of the character described, a housing, a pair of axle gears in axial alinement, a pair of shafts extending radially inward within said housing and carried by said housing, a pinion gear on each shaft, said pinion gears positioned equidistant between said axle gears but no meshing with them, said pinion gears spaced from each other, and a pair of bevel gears between said pinion gears, each bevel gear meshing with said pinion gears and with one of said axle gears.

5. In a differential mechanism of the character described, a housing, a pair of axle gears in axial alinement, pinion gears mounted on shafts extending radially inward within said housing, said shafts carried by said housing, said pinion gears positioned between said axle gears but not meshing with them, and bevel gears between said pinion gears, each bevel gear meshing with two pinion gears and with one of said axle gears.

6. In a differential mechanism of the character described, a housing, a pair of axle gears in axial alinement rotatably mounted within said housing, pinion gears mounted on shafts extending radially inward within said housing, said shafts carried by said housing, said pinion gears positioned between said axle gears but not meshing with them, and a bevel gear between each two pinion gears, meshing with said pinion gears and with one of said axle gears, said bevel gears alternately arranged with respect to said axle gears.

7. In a differential mechanism of the character described, a housing, a pair of axle gears in axial alinement rotatably mounted within said housing, pinion gears mounted on shafts extending radially inward within said housing, said shafts carried by said housing, said pinion gears positioned between said axle gears but not meshing with them, and a bevel gear between each two pinion gears, meshing with said pinion gears and with one of said axle gears, said bevel gears alternately arranged with respect to said axle gears, each of said bevel gears slidably mounted within said housing between a pair of pinion gears and one of said axle gears.

8. In a differential mechanism of the character described, a housing, a pair of axle gears in axial alinement rotatably mounted within said housing, pinion gears mounted on shafts extending radially inward within said housing, said shafts carried by said housing and located in a plane perpendicular to the axis of said axle gears, said pinion gears positioned between said axle gears but not meshing with them, and oscillating bevel gears meshing with said pinion gears and with said axle gears, each of said oscillating gears meshing with two of said pinion gears and one of said axle gears.

9. In a differential mechanism of the character described, a housing, a pair of axle gears in axial alinement rotatably mounted within said housing, pinion gears mounted on shafts extending radially inward within said housing, said shafts carried by said housing and located in a plane perpendicular to the axis of said axle gears, said pinion gears positioned between said axle gears but not meshing with them, and a pair of bevel gears between each two pinion gears, each bevel gear meshing with two pinion gears and with one of said axle gears, each of said bevel gears slidably mounted within said housing between two pinion gears and an axle gear.

10. In a differential mechanism of the character described, a pair of axle gears in axial alinement, pinion gears, and oscillating bevel gears meshing with said pinion gears and with said axle gears, each of said oscillating gears meshing with two of said pinion gears and one of said axle gears.

11. In a mechanism including a driving pinion gear and a driven gear spaced from each other, an intermediate gear meshing with and connecting said driving and said driven gears, the center of said intermediate gear being slidable within a restricted space, said driving gear, driven gear, and intermediate gears having rounded teeth and correspondingly rounded cavities between said teeth, whereby to provide rolling thrust bearings between said driving gear and said intermediate gear, and between said intermediate gear and said driven gear.

12. In a differential mechanism of the character described, a driving member, a pinion gear carried by said driving member, a driven member, a gear secured to said driven member, and an intermediate gear meshing with said driven member gear and with said pinion gear, said intermediate gear being slidable within a restricted space, whereby the distance between the center of said pinion gear and the center of said intermediate gear, and the distance between the center of said intermediate gear and the center of said driven member gear will vary, thereby varying the resistance to rotation offered by said intermediate gear.

13. In a power transmitting mechanism, a pair of gears in axial alinement, pinion gears spaced from said first mentioned gears, and intermediate gears meshing with said first mentioned gears and said pinion gears, each of said intermediate gears meshing with two pinion gears and one of said first mentioned gears, said intermediate gears being slidable within a restricted space, whereby the pitch circles of said intermediate gears may move into and out of intersection with the pitch circles of the corresponding pinion gears and first mentioned gears, the teeth of said gears being rounded and said gears having correspondingly rounded cavities between said teeth to provide rolling thrust bearings between meshing gears.

FERDINAND W. SEECK.